United States Patent

Honig et al.

[11] Patent Number: 4,811,631
[45] Date of Patent: Mar. 14, 1989

[54] SHIFTING METHOD FOR HYDRODYNAMIC-MECHANICAL TRANSMISSION

[75] Inventors: Ernst-August Honig; Lothar Kaspar; Manfred Kalversberg, all of Wolfsburg; Gerd Oberpichler, Braunschweig; Gottfried Hagemann, Wolfsburg; Dieter Schmidt, Gifhorn, all of Fed. Rep. of Germany

[73] Assignee: Volkswagen Aktiengesellschaft, Wolfsburg, Fed. Rep. of Germany

[21] Appl. No.: 869,995

[22] Filed: Jun. 3, 1986

[30] Foreign Application Priority Data

Jun. 21, 1985 [DE] Fed. Rep. of Germany ....... 3522184

[51] Int. Cl.⁴ ...................... F16H 57/10; F16H 47/08
[52] U.S. Cl. ........................................ 74/762; 74/688
[58] Field of Search .............. 74/762, 763, 720, 720.5, 74/688, 730, 731

[56] References Cited

U.S. PATENT DOCUMENTS

| 3,108,495 | 10/1963 | Winchell | 74/730 |
| 3,314,307 | 4/1967 | Egbert | 74/688 |
| 3,463,033 | 8/1969 | Fisher | 74/688 |
| 3,584,520 | 6/1971 | Borman | 74/763 |
| 3,986,413 | 10/1976 | Stockton | 74/762 X |
| 4,289,044 | 9/1981 | Dorpmund et al. | 74/688 |
| 4,331,044 | 5/1982 | Bookout et al. | 74/762 X |
| 4,592,250 | 6/1986 | Plasencia et al. | 74/731 X |
| 4,602,522 | 7/1986 | Dorpmund | 74/762 X |

FOREIGN PATENT DOCUMENTS

| 1214967 | 4/1966 | Fed. Rep. of Germany . |
| 1801249 | 8/1969 | Fed. Rep. of Germany . |
| 1625124 | 11/1975 | Fed. Rep. of Germany . |
| 2743583 | 4/1979 | Fed. Rep. of Germany . |
| 2830543 | 1/1980 | Fed. Rep. of Germany . |
| 2943119 | 6/1980 | Fed. Rep. of Germany . |
| 2106602 | 4/1983 | United Kingdom . |

Primary Examiner—Leslie A. Braun
Assistant Examiner—David Novais
Attorney, Agent, or Firm—Brumbaugh, Graves, Donohue & Raymond

[57] ABSTRACT

In a hydrodynamic-mechanical transmission for motor vehicles, consisting of a torque converter followed by a planetary gear with hydraulically actuable shift mechanism associated with the several transmission elements to select the various speeds, the planetary gear including a first sun gear connectable by way of a first clutch to the turbine rotor of the torque converter, a second sun gear connectable by way of a second clutch to the turbine rotor, a planetary mount connectable by way of a third clutch, bypassing the torque converter, directly to the engine drive shaft, on which mount first and second planet gears in engagement with each other and with the sun gears are mounted, and an internal gear constituting the drive output and in engagement with second planet gears meshing with the second sun gear, the possibility exists of reaching the third, direct speed either by purely hydrodynamic means including the torque converter by engaging the first and second clutches, by purely mechanical means bypassing the torque converter by engaging all three clutches, or in branched power trains by engaging the first or the second clutch and the third clutch. To achieve smooth transitions to and from third speed, when shifting up automatically from second to third speed, first the hydrodynamic train with first and second clutches engaged is to be selectable, and then the mechanical train by additionally engaging the third clutch. Then, shortly before shifting to fourth speed, the branched power train is to be selectable briefly by disengaging the first or the second clutch.

4 Claims, 1 Drawing Sheet

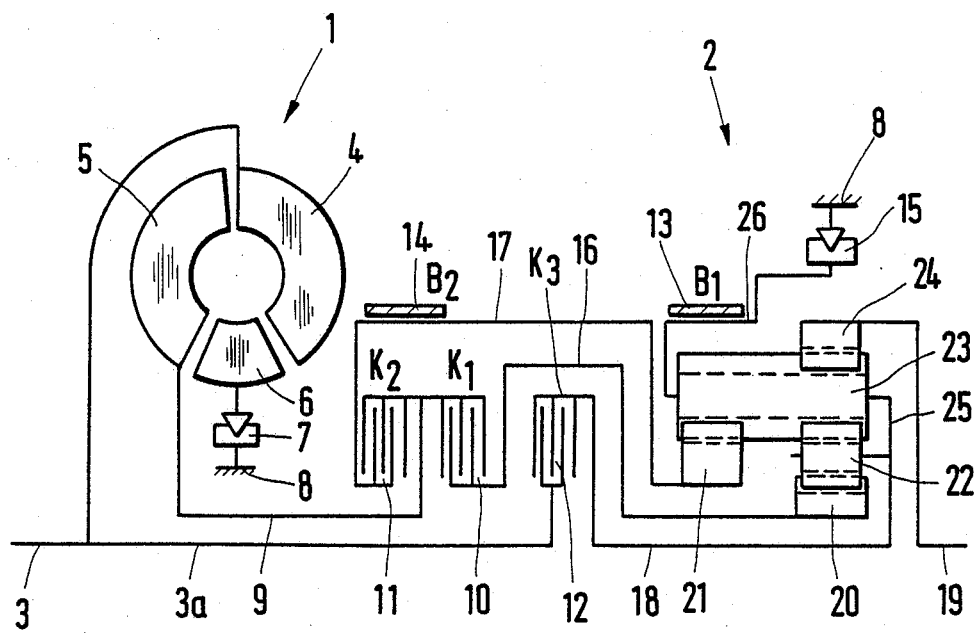

SHIFTING METHOD FOR HYDRODYNAMIC-MECHANICAL TRANSMISSION

BACKGROUND OF THE INVENTION

The invention relates to a shifting device for a hydrodynamic-mechanical transmission for motor vehicles, the transmission including a torque converter having a turbine rotor and a pump rotor, the torque converter being followed by planetary gear means with hydraulically actuatable shift means associated with the transmission elements so as to select various speeds.

German Public Disclosure No. DE-AS 1,214,967 discloses a hydrodynamic shift gear, in particular for motor vehicles, of the above type in which the third or direct speed may be operated hydromechanically, that is, including the torque converter; purely mechanically, bypassing the torque converter; or in branched train mode, that is, transmitting power both by way of the torque converter and bypassing it, as desired. In the transmission there described, however, these three possibilities are obtainable by special shift positions of the transmission control, where the mechanical train is to be used primarily for cruising on level surfaces, and the third speed with branched train primarily for cruising on moderate grades or in heavy traffic. The choice of these shift positions for the third speed according to the service condition of the vehicle is left to the driver, who will retain it without change for the prevailing condition.

SUMMARY OF THE INVENTION

Accordingly, it is an object of the invention to incorporate these three shifting possibilities for the third speed expediently and advantageously in the conventional automatic shift of such a hydrodynamic-mechanical transmission, in order to thereby achieve a comfortable ride with smooth shift changes.

Pursuant to this object, and others which will become apparent hereafter, one aspect of the present invention resides in a selecting device in which when shifting up automatically from second to third speed, first a hydrodynamic train with a first and a second clutch engaged, and then a mechanical train by additional engagement of a third clutch is selectable, and shortly before a shift to fourth speed, either of a pair of branched power trains is selectable by disengaging the first or the second clutch. The invention thus provides a quite definite shift sequence in third or direct speed, which proceeds automatically, where upon shifting up first the purely hydrodynamic train is selected and only then the mechanical train is selected, while a branched power train is not selected until shortly before shifting up to fourth speed. Here the mechanical third speed, as is known per se, is to be selected according to the road speed, so that at comparatively low road speeds the purely hydrodynamic train is left in. Upon shifting down, on the other hand, the process is to be reversed, first briefly selecting a branched power train, and only then the mechanical or the hydraulic train.

By virtue of this shift sequence, upon shifting up from second to third speed only one shift means need be taken out and a second put in, and the purely hydrodynamic torque transmission then at first existing will effectively damp the remaining variations in engine torque. If the following this selection of the hydrodynamic train, for example when a certain preassigned speed of the vehicle is exceeded, the third clutch is engaged in addition to the first two clutches, the resulting transmission of torque bypassing the torque converter will indeed achieve a more rigid connection of the engine to the driven wheels of the vehicle, which sometimes entails a less smooth transmission of the torque. In exchange, however, this purely mechanical path of transmission serves to reduce the losses otherwise occurring in the torque converter, so that a more economical operation of the vehicle is possible. Shortly before shifting to fourth speed, when in addition to the third clutch only a brake is engaged, according to the invention the branched train third speed is to be selected by disengagement of the first or the second clutch. This too results in smoother shifting, since in the first place the transmission of torque is at least partially damped by the reintroduced torque converter. In the second place, the shift from third to fourth speed is considerably simpler to control if there is only one shift means to be taken out and one other to be put in.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

BRIEF DESCRIPTION OF THE DRAWINGS

The drawing, in terms of a schematic block diagram, indicates an embodiment of the basic hydrodynamic-mechanical motor vehicle transmission pursuant to the present invention.

DETAILED DESCRIPTION OF THE PREFERRED EMBODIMENTS

In the drawing, 1 designates a hydrodynamic torque converter and 2 a planetary or orbiting gear transmission transmitting the torque from an engine (not shown) to the powered wheels of a motor vehicle, in particular a passenger vehicle, (not shown).

The torque converter 1 includes essentially a pump rotor 4 driven by a motor shaft 3, a turbine rotor 5, and a guide wheel 6 mounted by a coaster 7 on a stationary housing 8. The turbine rotor 5 is connected to a hollow turbine shaft 9 connectable by way of a first clutch 10 ($K_1$) to a first sun gear 20 and by way of a second clutch 11 ($K_2$) to a second sun gear 21 of the planetary gear transmission 2. The connection between the clutches and the sun gears is made by way of members 16 and 17.

The planetary gear transmission 2 further comprises a first planet gear 22 and a second planet gear 23 in engagement with each other. While the first planet gear 22 meshes with the first sun gear 20, the second planet gear 23 is engaged with the first planet gear 22, with the second sun gear 21, and with an internal gear 24 connected to a drive output shaft 19 leading to the axle drive (not shown) of the motor vehicle.

The first and second planet gears 22, 23 are mounted on a planetary mount 25 bearing firstly by way of an arm 26 and a coaster 15 on the transmission housing 8 and connectable secondly by way of a member 18 and a third clutch 12 ($K_3$) directly to the stub drive shaft 3a passed centrally through the turbine shaft 9.

13 and 14 are first and second brakes, here in the form of band brakes, of which the first brake 13 ($B_1$) acts on the arm 26 of planetary mount 25 and the second brake 14 ($B_2$) on the member 17 embracing the three clutches 10, 11 and 12 bell-fashion and connected to the second sun gear 21.

With this transmission schematically shown in the drawing, by suitable actuation of the shift means, four speeds forward and one reverse can now be selected in accordance with the following table, where the shift means engaged in each speed are marked "x".

SHIFT TABLE

| Shift means: | $K_1$ 10 | $K_2$ 11 | $K_3$ 12 | $B_1$ 13 | $B_2$ 14 | F 15 |
|---|---|---|---|---|---|---|
| 1 | x | — | — | (x) | — | x |
| 2 | x | — | — | — | x | — |
| 3 H | x | x | — | — | — | — |
| 3 M | x | x | x | — | — | — |
| 3 LT 1 | x | — | x | — | — | — |
| 3 LT 2 | — | x | x | — | — | — |
| 4 | — | — | x | — | x | — |
| R | — | x | — | x | — | — |

According to this table, in first speed forward the first clutch 10 is actuated, connecting the turbine shaft 9 to the first sun gear 20 of the planetary gear 2. The torque reaction of the planetary gear is transmitted by way of the mount 18, fixed by the coaster 15 during the period of acceleration. This brake effect may, especially in push mode, be additionally supported by the brake effect of the first brake 13, which permits a brake effect in both directions of rotation and hence an engine brake mode as well. Ordinarily, this first brake 13 is engaged in position "1" selectable with the shift lever, in which only the first speed is engaged and all other speeds are blocked.

Second speed, on the other hand, with first clutch 10 engaged, is selected by fixing the second sun gear 21 by means of the second brake 14, securing the bell-like connecting member 17. The torque transmission in this case takes place from the first sun gear 20 to the internal gear 24 by way of the first planet gears 22 and second planet gears 23 meshing with the second stationary sun gear 21. The planetary mount 25 coast along in this case.

The third, direct speed, in the transmission according to the invention, may be reached in four different ways, namely in one alternative by engaging the first and second clutches 10, 11, in which case, owing to the drive of both sun gears 20 and 21 from the turbine shaft 9, the entire planetary gear 2 is locked. Since in this transmission of torque the torque converter 1 remains engaged, variations of torque arising in the engine can be damped. This alternative is designated in the table by 3 H (H=hydraulic).

3 M (M=mechanical) instead designates an alternative for third speed in which the torque, bypassing the torque converter 1, is passed directly from the engine drive shaft 3 to the planetary gear 2 and thence by way of the power output shaft 19 to the wheels of the vehicle. In this case, besides the first two clutches, the third clutch 12 is engaged as well, the driving torque being transmitted solely by way of the stub drive shaft 3a and the third clutch 12 to the planetary mount 25 of the planetary gear 2, revolving as a whole by reason of the two engaged clutches 10 and 11.

In the third and fourth alternatives, designated 3 $LT_1$ and 3 $LT_2$ (LT=branched train), for third speed, one of the first two clutches, the second clutch 11 in case $LT_1$ and the first clutch 10 in case $LT_2$, is disengaged, relative to 3 M, so that a torque transmission with branched train partially bridging the torque converter 1 results. Here some of the torque coming from the drive shaft 3 is put in by way of the torque converter 1 and turbine shaft 9 as well as one of the two clutches 10 and 11, and the rest of the torque directly, bypassing the torque converter 1, by way of the stub drive shaft 3a, the third clutch 12, connecting member 18 and mount 25 into the planetary gear 2.

In fourth speed, besides the third clutch 12, the second brake 14 is set to fix the second sun gear 21. The transmission of torque here takes place bypassing the torque converter 1 directly by way of the third clutch 12 into the mount 25 of planetary gear 2. The drive output by way of internal gear 24 then goes into high, that is, the drive output shaft 19 rotates at higher speed than the driving shaft 3.

In reverse, finally, the second clutch 11 and the first brake 13 are engaged, whereby with planetary mount held fixed the second sun gear 21 is driven, which after reversal of direction of rotation in the second planetary gear 23 delivers the torque to the internal gear 24.

Now ordinarily, the shifting of the several speeds takes place automatically according to the road speed and the intention of the operator, as indicated for example by the accelerator, a transmission control (not shown) determining the supply of hydraulic medium to the several shift means. A hand selector lever usually provided permits the selection of certain drive levels, among which, besides a park setting in which the transmission is blocked and a neutral setting in which no train is engaged, there are usually a reverse "R" and several forward speeds, namely at least one level "D" for cruising, in which all speeds are shifted automatically, and a level "1," in which only the first speed is selected and all other speeds are blocked. In addition there may be still other levels, in which for example only the two or three lowest speeds are selected and any higher speeds are blocked.

In automatic shifting of speeds in the normal drive level D, when shifting up from second to third speed, first the hydraulic train 3 H is engaged, the second clutch 11 being let in instead of the second brake 14, which was set in second speed. Provided a sufficiently high road speed is reached, then, by engaging the third clutch 12, the purely mechanical transmission is selected, providing a more efficient and economical transmission of power. Shortly before shifting up to fourth speed, one of the branched third speeds is then selected briefly by disengagement of one of the first two clutches 10 and 11, preferably the second clutch 11 in order to reach the third speed 3LT, whence the fourth speed is then reached directly by setting the second brake 14 instead of the first clutch 10. Upon automatically shifting down from fourth to third speed, the process is reversed, briefly shifting to the branched third speed after disengaging the fourth speed, before the complete bypass third speed 3 M is put in. Here, however, it is expedient to select the branched train $3LT_2$ with second and third clutches 11, 12 engaged. Since the second clutch 11, which does the shifting work in changing speeds, unlike the first clutch 10, is frequently and expediently equipped with an accumulator, a smooth, concussion-free torque transmission is obtained in shifting.

This sequence in automatic shifting ensures smooth transmissions and simplifies transmission control where each shift requires only that one shift means be disengaged and another one engaged.

While the invention has been illustrated and described as embodied in a Shifting Device For A Hydrodynamic-Mechanical Transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method for shifting a motor vehicle transmission having a hydrodynamic torque converter and a planetary gear transmission, the torque converter including a pump rotor connected to a motor shaft and a turbine rotor, said gear transmission including a first sun gear connectable to said turbine rotor by a first clutch, a second sun gear connectable to said turbine rotor by a second clutch, a planetary mount connectable to said pump rotor by a third clutch, bypassing said torque converter, a first planet gear mounted on said mount and engaging said first sun gear, a second planet gear mounted on said mount and engaging said second sun gear, said first planet gear, and an internal gear connected to a power output shaft, wherein said gears and clutches are arranged to provide a direct drive transmission gear ratio either by engagement of the first and second clutches, or by engagement of the first and third clutches, or by engagement of the second and third clutches, or by engagement of the first, second and third clutches, said method comprising the sequential steps of:

responsively to said transmission automatically shifting from second gear to said direct drive, regardless of operating speed of the vehicle, setting a first clutch condition for said direct drive transmission ratio in which said first and second clutches are engaged and said third clutch is disengaged, for providing a hydrodynamic torque transmission path including said torque converter;

responsively to the traveling speed of the vehicle exceeding a first predetermined speed, automatically setting a second clutch condition for said direct drive transmission ratio in which said first, second and third clutches are engaged, for providing a mechanical torque transmission path which at least partially bypasses said torque converter, said first and second clutch conditions thereby providing the same direct drive transmission ratio with different torque transmission paths; and responsively to the traveling speed of the vehicle approaching a speed at which the transmission automatically upshifts to fourth gear from said direct drive transmission ratio automatically setting a third clutch condition for said direct drive transmission gear in which said third clutch and one of said first and second clutches are engaged, for providing one of first and second branched train torque transmission paths each of which partially bypasses said torque converter, said transmission upshifting to fourth gear only when said clutches are in said third clutch condition.

2. A shifting method as defined in claim 1, wherein one of said branched train transmission paths is initially briefly selected during downshifting from fourth gear to said direct drive, and wherein one of said mechanical and hydrodynamic torque transmission paths is selected after said one branched train transmission path is selected.

3. A shifting method as defined in claim 1, wherein the branched train torque transmission path is selected by engagement of said first and said third clutches during a shift up from said direct drive transmission ratio to fourth gear.

4. A shifting method as defined in claim 1, wherein the branched train torque transmission path is selected by engagement of said second and said third clutches during a shift down from fourth gear to said direct drive transmission ratio.

* * * * *